United States Patent [19]

Akashi et al.

[11] 4,114,670
[45] Sep. 19, 1978

[54] METHOD FOR SECURING SCREW MEANS ONTO METAL PLATE AND METAL PLATE HAVING SCREW MEANS SECURED

[75] Inventors: Tetsuya Akashi; Akio Nikawa, both of Hatano, Japan

[73] Assignee: Topura Co., Ltd. (Kabushiki Kaisha Tohpura), Japan

[21] Appl. No.: 706,430

[22] Filed: Jul. 19, 1976

[30] Foreign Application Priority Data

Apr. 7, 1976 [JP] Japan .................................. 51/37275

[51] Int. Cl.² ...................... F16B 39/28; B21D 39/00; B23P 11/02
[52] U.S. Cl. ................................. 151/41.72; 29/509; 29/522 R
[58] Field of Search ................ 29/509, 522; 151/41.72

[56] References Cited

U.S. PATENT DOCUMENTS

| | | | |
|---|---|---|---|
| 1,591,057 | 7/1926 | Schwartz | 151/41.72 UX |
| 1,759,339 | 5/1930 | Andren | 151/41.72 |
| 1,872,616 | 8/1932 | Andren | 151/41.72 |
| 2,007,179 | 7/1935 | Bullis | 151/41.72 UX |
| 2,129,583 | 9/1938 | Johansson | 151/41.72 UX |
| 2,276,050 | 3/1942 | Leighton | 29/509 |
| 3,367,685 | 2/1968 | Church et al. | 151/41.72 X |
| 3,381,362 | 5/1968 | Church et al. | 29/509 X |

*Primary Examiner*—Charlie T. Moon
*Attorney, Agent, or Firm*—Blum, Moscovitz, Friedman & Kaplan

[57] ABSTRACT

At least one screw means provided with an angular stepped neck by certain distance from the bearing surface of a screw head thereof is fastened firmly onto a metal plate having at least one opening of a shape corresponding to that of the stepped neck through the opening at the surface of a receiving means having at least one hole bored therethrough to insert a screw body of the screw means thereinto by pressing the stepped neck and the receiving means against each other to cause the stepped neck and the opening to be deformed plastically so that the metal plate is tightly clamped between the deformed stepped neck and the screw head to form the fastened assembly of the metal plate and the screw means.

When fastening a plurality of screw means onto the metal plate, a receiving means having a plurality of holes corresponding to the screw bodies respectively is used for upsetting operation. The holes are constructed so that the axes of the holes adjacent to each other are in one plane and are parallel to fasten the plural screw means onto the metal plate regularly and firmly at a time. The fastened assembly is detached from the receiving means by tapping and pushing up the heads of the screw bodies with a knockout means.

An apparatus for fastening the screw means onto the metal plate and detaching the fastened assembly therefrom comprises a vertically movable pressing means for applying force to the stepped necks, a receiving means positioned under the pressing means for fastening together the both components and a knockout means positioned under the receiving means for detaching the fastened assembly from the receiving means.

15 Claims, 10 Drawing Figures

METHOD FOR SECURING SCREW MEANS ONTO METAL PLATE AND METAL PLATE HAVING SCREW MEANS SECURED

BACKGROUND OF THE INVENTION

This invention relates to a method and apparatus for fastening mechanically screw means onto a metal plate, and a metal plate having screw means fastened thereonto.

In the mechanical industry it is required for certain application that a screw means, for instance, a screw or a bolt is secured onto a metal plate such as a base board or the like, or the head portion of the screw means is enlarged much wider than the screw body thereof. To meet the requirement, an invention disclosed in Japanese Utility Model Publication No. 20,536/1959, one of hitherto known technics proposes a method comprizing providing a screw with a stepped neck at the filet of the head thereof, inserting the stepped neck into an opening piercing a metal plate and applying caulking operation to the edge portion of the stepped neck of the screw so that it is secured onto the metal plate through the opening. It is pointed out with the above hitherto known method, however, that the fastening effect of the screw into the opening is unstable and insufficient merely with the "caulking operation" mentioned in the above known technics and moreover it is practically impossible to inspect on-site how tightly the screw is fastened.

Furthermore, a conventional welding method for fastening a plurality of screw means onto a metal plate brings the disadvantage that the plural screw means fastened onto the metal plate are apt to become irregular, that is, the axes of the screw means adjacent to each other are not in one plane and are not parallel to each other, because the fastened assembly of the screw means and the metal plate is deformed due to heat applied thereto in the welding operation. Such irregularity is undesirable since the plural screw means which have been fastened onto the metal plate cannot be engaged smoothly with an article to which the screw means are to be installed.

SUMMARY OF THE INVENTION

According to the present invention, a method for fastening one or more screw means onto a metal plate and a metal plate having one or more screw means fastened thereonto are provided. The screw means is provided with a stepped neck between a screw head and a screw body thereof by certain distance from the bearing surface of the screw head. The stepped neck is inserted into an opening piercing the metal plate so that the bearing surface of the screw head comes in tightly contact with the metal plate. The screw means and the metal plate are fastened together by applying force to the end portion of the stepped neck at the surface of a receiving means having a hole bored therethrough to allow the screw body to be inserted thereinto so as to cause the outer wall of the stepped neck to be radially enlarged to form a flange and to cause the opening to be plastically deformed, so that the metal plate is tightly clamped between the stepped neck and the screw head. When a plurality of screw means are fastened on a metal plate through a plurality of openings of the metal plate respectively, a receiving means having a plurality of holes to allow the plural screw bodies to be inserted thereinto respectively is used. The holes are constructed so that a distance between the axes of the holes adjacent to each other is maintained within its allowable error, and the axes of the holes adjacent to each other are in one plane and are parallel, thus the plural screw means can be fastened regularly and firmly onto the metal plate at a time.

As a result of the fastening operation, when the fastened assembly of the screw means and the metal plate has clung to the receiving means, the fastened assembly can be easily freed from the receiving means by tapping manually or mechanically the head of the screw body and pushing up the fastened assembly. The detaching operation is preferably conducted mechanically with a knockout means.

Furthermore, according to the present invention, an apparatus for fastening one or more screw means onto a metal plate and detaching the fastened assembly from the apparatus is provided. The apparatus comprises a pressing means for applying force to a stepped neck of the screw means, a receiving means for clamping the metal plate between the stepped neck and a screw head of the screw means thereon, and a knockout means for detaching the fastened assembly from the receiving means. When the pressing means is actuated, the stepped neck is pressed against the receiving means to cause the stepped neck and the metal plate to be deformed, so that the metal plate is tightly clampled between the stepped neck and the screw head to form the fastened assembly. When the fastening operation is accomplished, the pressing means is released from the fastened assembly and then the knockout means is actuated to tap the head of the screw body and to push up the fastened assembly, thus the fastened assembly is detached from the receiving means.

Accordingly, an object of the present invention is to provide a method for fastening simply at least one screw means onto a metal plate.

Another object of the present invention is to provide a method for fastening at least one screw means onto a metal plate so that the screw means and the metal plate may be tightly secured together.

Another object of the present invention is to provide a method for fastening at least one screw means onto a metal plate and detaching the fastened assembly of the screw means and the metal plate from a fastening means, successively and simply.

A further object of the present invention is to provide a method for fastening simply a plurality of screw means onto a metal plate at a time.

A further object of the present invention is to provide a method for fastening a plurality of screw means onto a metal plate at a time so that the both components may be tightly secured together.

A further object of the present invention is to provide a method for fastening a plurality of screw means onto a metal plate at a time so that the plural screw means may be fastened regularly and firmly onto the metal plate.

A further object of the present invention is to provide a method for fastening a plurality of screw means onto a metal plate at a time without breaking the both components.

A further object of the present invention is to provide a method for fastening a plurality of screw means onto a metal plate at a time and detaching the fastened assembly from a fastening means, successively and simply.

A further object of the present invention is to provide a metal plate having at least one screw means fastened thereonto so as to prevent the both components from rotating or moving against each other.

A further object of the present invention is to provide a metal plate having a plurality of screw means fastened thereonto so as to prevent the both components from rotating or moving against each other.

A further object of the present invention is to provide a metal plate having a plurality of screw means fastened thereonto regularly and firmly.

A further object of the present invention is to provide an apparatus for fastening at least one screw means onto a metal plate and detaching the fastened assembly successively by a simple operation.

Still a further object of the present invention is to provide an apparatus for fastening a plurality of screw means onto a metal plate and detaching the fastened assembly successively by a simple operation.

Other objects and advantages of the present invention will be apparent from the following description and claims.

BRIEF DESCRIPTION OF THE DRAWINGS

The aforementioned characteristic features of the invention will be more readily understood from the following description taken in connection with the accompanying drawings, in which.

DESCRIPTION OF THE PREFERRED EMBODIMENTS

Figure 1:
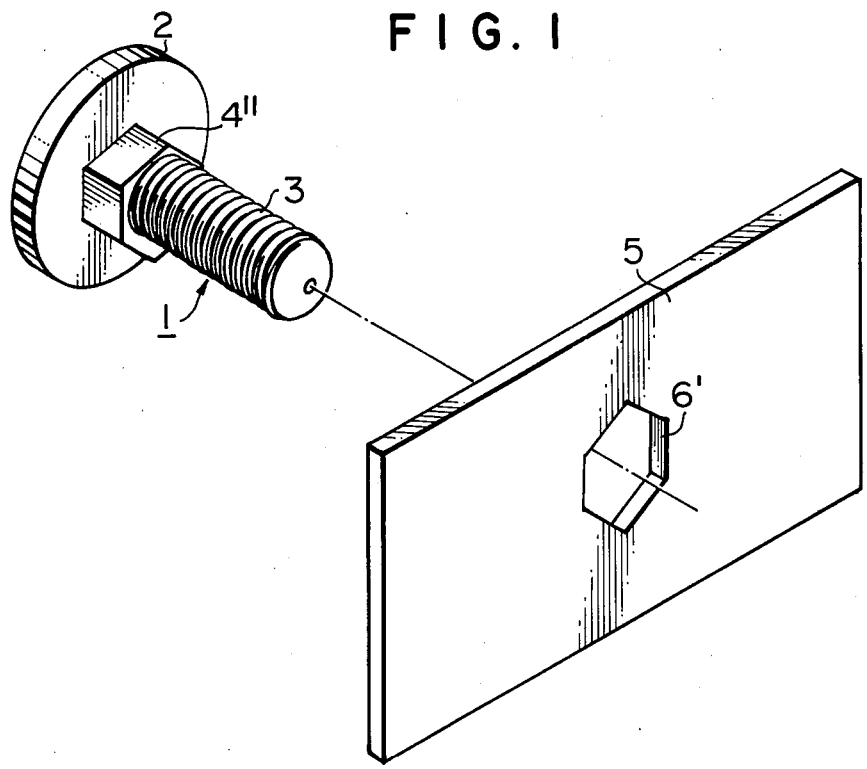
FIG. 1 is an exploded perspective view of a screw means and a metal plate to be fastened together according to one embodiment of the present invention.
Figure 3:
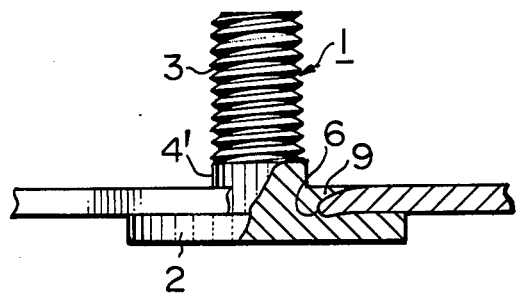
FIG. 3 is a partially sectional view of the fastened assembly of the screw means and the metal plate of FIG. 1 after upsetting operation.
Figure 2:
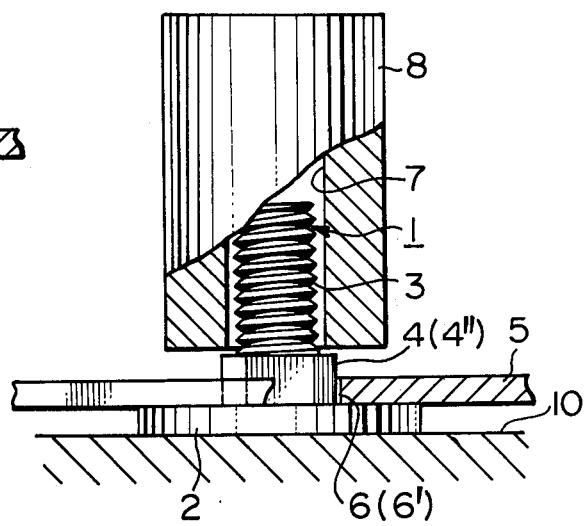
FIG. 2 is a partially sectional view of the assembly of the screw means and the metal plate of FIG. 1 before fastening operation, together with a receiving means to be pressed against a stepped neck of the screw means.

Referring to FIGS. 1 to 3, there is shown an embodiment of the present invention for fastening at least one screw means onto a metal plate. As shown in FIG. 1, a screw means (1) having a screw head (2), particularly a flat fillister head, and a screw body (3) is provided with a stepped neck (4), particularly an angular stepped neck (4"), between the screw head (2) and the screw body (3) by certain distance from the bearing surface of the screw head (2).

On a metal plate (5) onto which the screw means (1) is to be fastened is provided at least one opening (6), particularly an angular opening (6') of which shape corresponds to that of the angular stepped neck (4") of the screw means (1). The angular stepped neck (4") is inserted into the angular opening (6') so that the bearing surface of the screw head comes in closely contact with the surface of the metal plate (5), to thereby sandwich the screw head (2) between the metal plate (5) and a pedestal plate (10), as shown in FIG. 2.

The screw means (1) is fastened onto the metal plate (5) at the surface of a receiving means, generally indicated at (8), as shown in FIG. 2. The receiving means (8) has at least one hole (7) bored therethrough, which has an inner diameter a little larger than the outer diameter of the screw body (3) to allow the screw body (3) to be inserted thereinto. As shown in FIG. 2, the receiving means (8) is put on the screw body (3) though the hole (7) so that the end surface of the receiving means (8) comes in contact with the end surface of the stepped neck (4) of the screw means (1). Then, striking force is applied on the stepped neck from the upper end of the receiving means (8), so that upsetting takes place on the stepped neck (4) at the surface of the receiving means. This causes the outer wall of the stepped neck (4) to be radially enlarged mostly by shearing to form a radially extending flange (9), followed by appearance of new metal surface (4'''), and causes the opening (6) of the metal plate (5) to be plastically deformed, as shown in FIG. 3. Such plastic deformation of the stepped neck of the screw means and the metal plate results in tight clamping of the metal plate (5) between the flange portion (9) and the screw head (2) of the screw means. The striking force may be applied on the stepped neck (4) from the upper surface of the pedestal plate (10).

As described above, according to the embodiment of the present invention as shown in FIGS. 1 to 3, the angular shape of the stepped neck (4) of the screw means (1) and the angular shape of the opening (6') of the metal plate (5) corresponding thereto contribute to the complete prevention of the both components from rotating or moving against each other. Furthermore, the upsetting operation by means of the receiving means (8) provides strong fastening of the screw means (1) onto the metal plate (5).

The angular stepped neck (4") and the angular opening (6') are preferably shaped hexagonally so as to achieve stronger fastening of the both as well as more sufficient prevention of rotation. The portion of the receiving means (8) to be pressed against the stepped neck (4) is preferably made of hard metal so that the stepped neck (4) and the metal plate (5) may be fully deformed.

Furthermore, cushioning means such as a spring, foamed urethane or the like is preferably interposed between the metal plate (5) and the receiving means (8) to apply striking force uniformly and slowly on the stepped neck (4), to thereby deform the stepped neck (4) and the metal plate (5) without breaking.

As a result of the fastening operation, when the receiving means has clung to the fastened assembly of the screw means (1) and the metal plate (5), the fastened assembly is easily detached from the receiving means (8) by tapping manually or mechanically the head of the screw body (3) and pushing up the fastened assembly with a knockout pin inserted into the hole (7) from the opposite side of the screw means, as described hereinafter.

The operations of fastening the screw means (1) onto the metal plate (5) and detaching the fastened assembly from the receiving means (8) may be conducted successively as described hereinafter.

Figure 4:
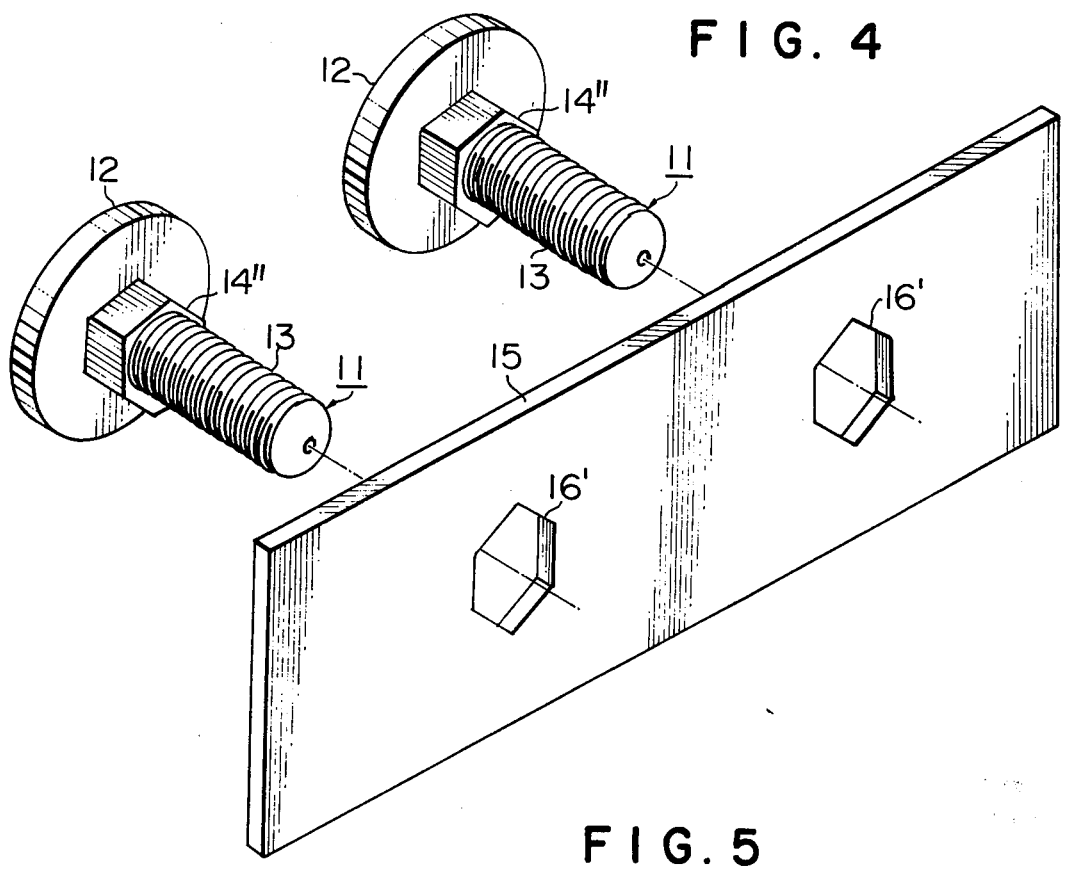
FIG. 4 is an exploded perspective view showing a plurality of screw means and a metal plate to be fastened together according to another embodiment of the present invention.

Referring to FIGS. 4 to 7, there is shown another embodiment of the present invention for fastening a plurality of screw means onto a metal plate. Each screw means (11) and opening (16) of the metal plate (15) are constructed in the same manner as those of the embodiment of FIGS. 1 to 3. As shown in FIG. 4, each of the screw means (11) has a screw head (12), particularly a flat fillister head, a screw body (13) and a stepped neck (14) which is preferably shaped angularly. The opening (16) is preferably angular opening (16') to correspond to the angular stepped neck (14''). The angular stepped necks (14'') are inserted into the angular openings (16') respectively so that the bearing surfaces of the screw heads (12) come in closely contact with the surface of the metal plate (15), to thereby sandwich the screw heads (12) between the metal plate (15) and a pedestal plate (20).

Figure 5:
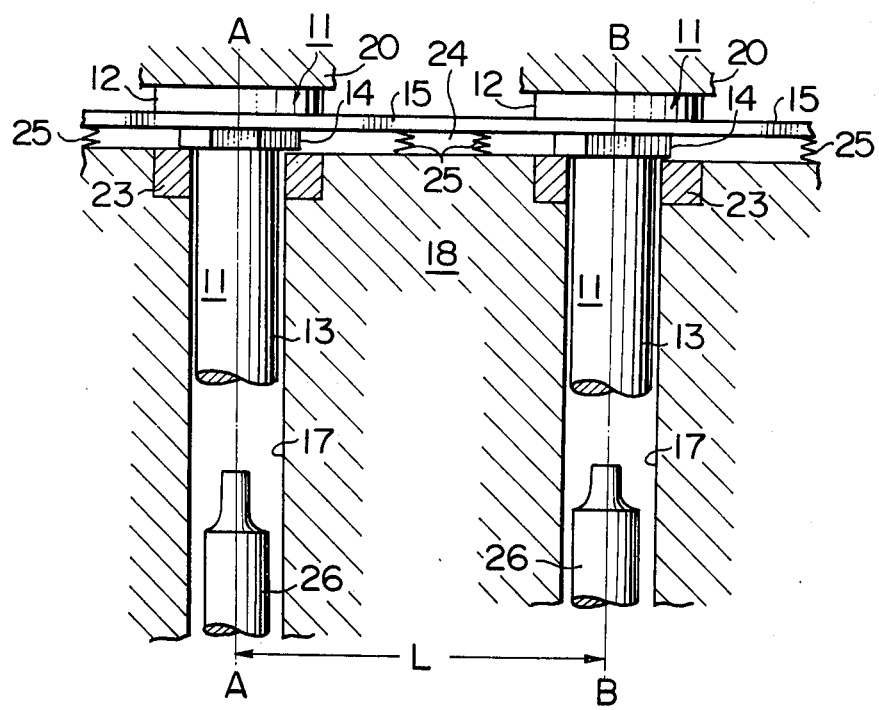
FIG. 5 is a partially sectional view of the assembly of the plural screw means and the metal plate of FIG. 4 before fastening operation, together with a receiving means to be pressed against stepped necks of the screw means.

Means for fastening the plural screw means (11) onto the metal plate (15) is a receiving means (18), which is shown in FIG. 5. The receiving means (18) has a plurality of holes (17) bored therethrough. Each of the holes (17) has a little larger diameter than that of the corresponding screw body (13) to allow the plural screw bodies (13) to be inserted into the holes (17) respectively. The holes (17) are also constructed, as shown in FIG. 5, so that a distance (L) between the axes $(\overline{AA})$ and $(\overline{BB})$ of the holes (17) adjacent to each other is maintained within its allowable error, and the axes $(\overline{AA})$ and $(\overline{BB})$ of the holes (17) adjacent to each other are in one plane and are parallel to each other.

Figure 6:
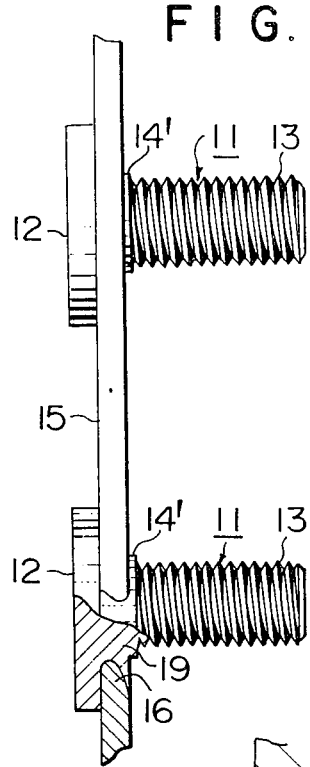
FIG. 6 is a partially sectional view of the fastened assembly of the screw means and the metal plate of FIG. 4 after upsetting operation.
Figure 7:
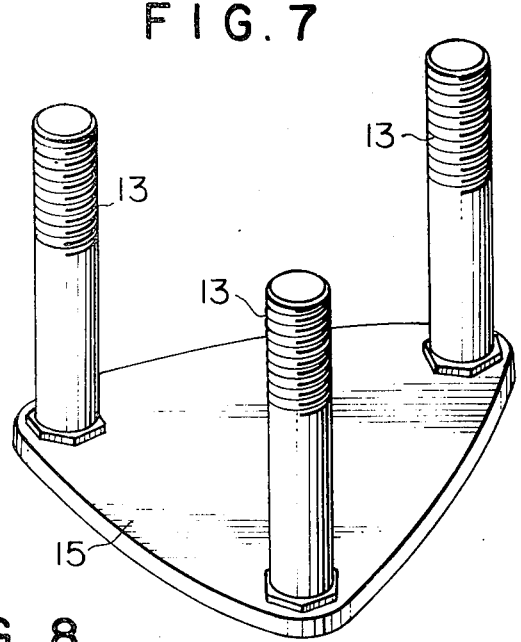
FIG. 7 is a perspective view of the fastened assembly of FIG. 6.

The receiving means (18) is put on the screw bodies (13) through the holes (17) corresponding thereto so that the end surface of the receiving means (18) comes in contact with the end surface of the stepped neck (14) of each screw means (11). Then, striking force is applied on the stepped necks (14) from the upper end of the receiving means (18) or the upper surface of the pedestal plate (20) so that upsetting takes place on the stepped necks (14). This causes the outer wall of each of the stepped necks (14) to be radially enlarged mostly by shearing to form a radially extending flange (19), followed by appearance of new metal surface (14'), and causes the openings (16) of the metal plate (15) to be plastically deformed, as shown in FIG. 6. Such plastic deformation of the stepped necks of the screw means and the metal plate results in tight clamping of the metal plate (15) between the flange portions (19) and the head portions (12) of the screw means.

Furthermore, the screw means (11) guided by the holes (17) of which the axes $(\overline{AA})$ and $(\overline{BB})$ adjacent to each other are in one plane and are parallel to each other are fastened onto the metal plate (15) in such a manner that the axes of the screw means (11) adjacent to each other are in one plane and are parallel to each other, therefore, the plural screw means (11) which has been fastened onto the metal plate (15) can be engaged smoothly with holes of an article to which the fastened assembly is to be installed.

The portions (23) of the receiving means (18) to be pressed against the stepped necks (14) are preferably made of hard metal so that the stepped necks (14) and the openings (16) of the metal plate (15) may be fully deformed.

As shown in FIG. 5, cushioning means (25) such as a spring, foamed urethane or the like is preferably interposed in the space (24) between the receiving means (18) and the metal plate (15). The cushioning means (25) acts on the receiving means (18) so as to apply striking force uniformly and slowly on the stepped necks (14) through the receiving means (18), to thereby achieve slowly the radial enlargement of the stepped necks (14) without breaking owing to excessive striking force or the like.

Figure 8:
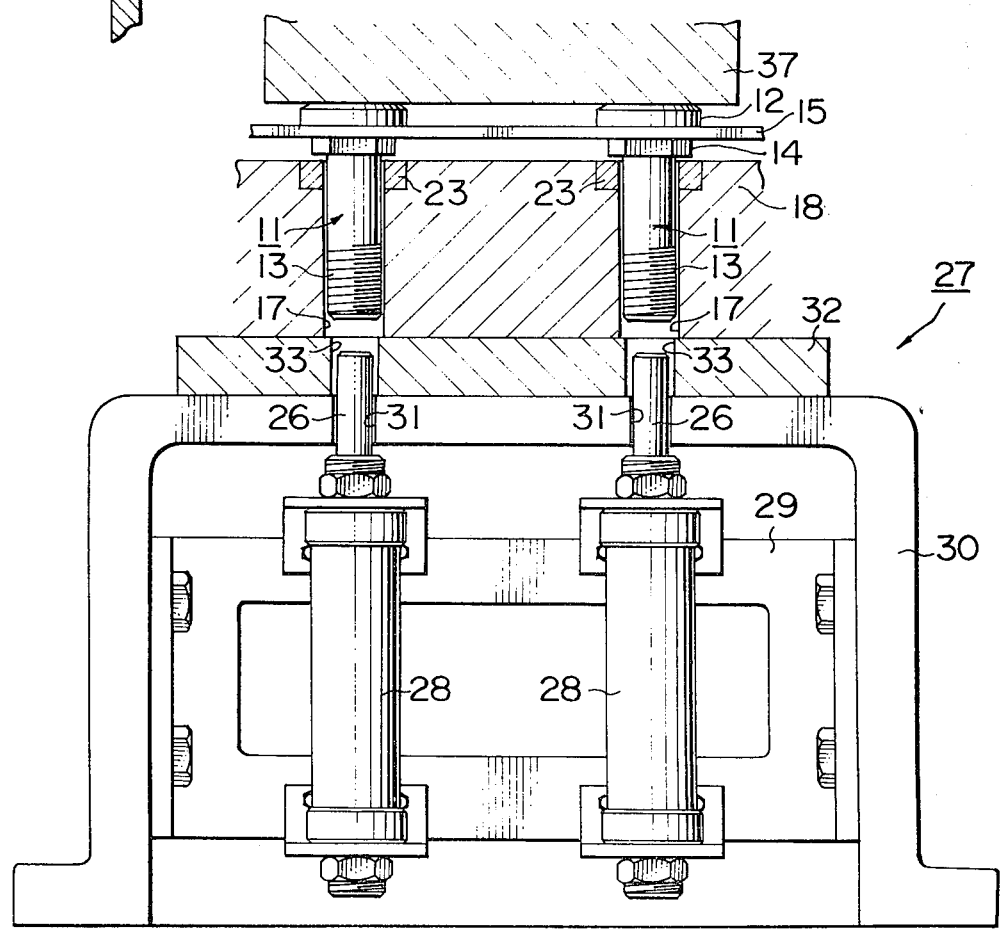
FIG. 8 is an enlarged vertical sectional view of a knockout apparatus for detaching a fastened assembly from a receiving means.

As a result of the fastening operation, when the receiving means (18) has clung to the fastened assembly of the screw means (11) and the metal plate (15), the fastened assembly comes easily off the receiving means (18) by tapping and pushing up manually or mechanically the heads of the screw bodies (13) with knockout pins (26) as shown in FIG. 5. The detaching of the fastened assembly from the receiving means (18) is preferably conducted mechanically by means of a knockout apparatus (27) as shown in FIG. 8. In the knockout apparatus (27), the knockout pins (26) are actuated vertically by means of pistons (not shown) within air cylinders (28) mounted in a cylinder support (29) which is provided in a bed (30). The bed (30) is provided with openings (31) at the upper portion thereof to allow the knockout pins (26) to be moved upwardly therethrough. On the housing (30) is preferably provided a bolster (32) for supporting the receiving means (18) thereon, the bolster being provided with openings (33) aligned with the openings (31) to permit the pins (26) to be moved upwardly therethrough. The knockout pins (26) are disposed to be in alignment with the holes (17) of the receiving means (18) when the fastened assembly and the receiving means (18) clinging thereto have been brought to a predetermined place on the bolster (32). The knockout pins (26) are moved upwardly through the openings (31) (33) and the holes (17) by means of the air cylinders (28) to tap the heads of the screw bodies (13) and to push up the fastened assembly, to thereby detach easily the fastened assembly from the receiving means.

It is to be understood that, in the embodiment of FIGS. 1 to 3, when the receiving means (8) has clung to the fastened assembly of the screw means (1) and the metal plate (5), the fastened assembly can be detached from the receiving means (8) in the same manner.

Figure 9:
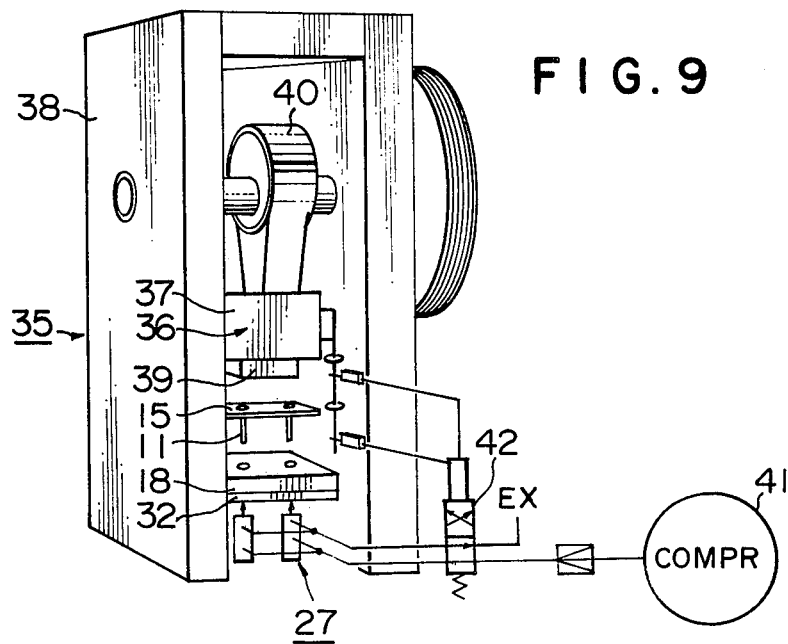
FIG. 9 is a perspective view of an apparatus for fastening at least one screw means onto a metal plate and detaching the fastened assembly from a receiving means successively.
Figure 10:
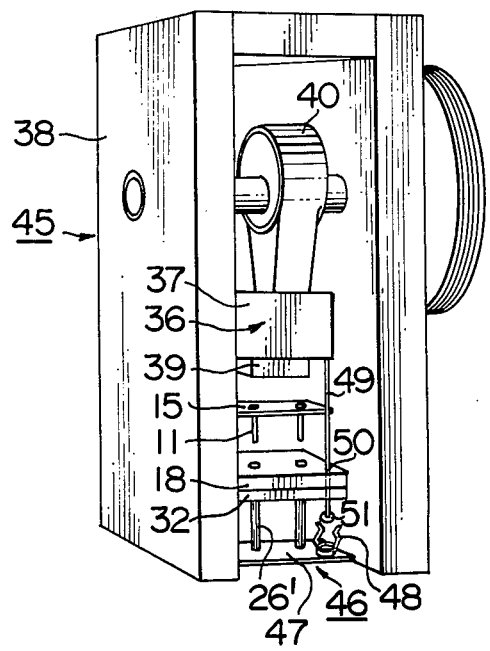
FIG. 10 is a perspective view of another apparatus for conducting the fastening and detaching operations successively.

The fastening of the screw means (11) onto the metal plate (15) and the detaching of the fastened assembly from the receiving means (18) may be conducted successively by means of an apparatus as shown in FIG. 9 or 10.

The apparatus (35) shown in FIG. 9 comprises a pressing means (36) for applying force to the stepped necks (14), the receiving means (18) and the knockout apparatus (27). The pressing means (36) may consist of vertically reciprocatable slide (37) of a pressing machine (38) such as a crank press and a platen (39) attached to the lower surface of the slide (37). The slide (37) may be moved vertically by means of a suitable means such as a crank mechanism (40). The receiving means (18) is disposed to be positioned under the pressing means (36), and the knockout apparatus (27) is positioned under the receiving means (18) so that the knockout pins (26) are in alignment with the holes (17) of the receiving means (18). The receiving means (18) may be placed on the knockout apparatus (27) through the bolster (32). The pressing means (36) and the knockout apparatus (27) are alternately connected to a suitable driving means (41) such as a compressor through a changeover switching means, particularly an automatic one such as a magnet valve (42), so that the knockout apparatus (27) is actuated when the pressing means (36) has been moved upwardly after the fastening operation.

The operation of the apparatus (35) will be now explained. The assembly of the screw means (11) and the metal plate to be fastened together is engaged with the receiving means (18), as shown particularly in FIG. 8. When the pressing means (36) is actuated and reaches to the bottom dead center of the stroke thereof, the stepped necks (14) are pressed against the receiving means (18) to cause the stepped necks (14) and the metal plate (15) to be deformed plastically, thus the metal plate (15) may be tightly clamped between the stepped necks (14) and the screw heads (12). When the fastening operation has been accomplished, the slide (37) is moved upwardly to cause the platen (39) to be released from the fastened assembly, and then the switch (42) actuates the knockout apparatus (27) to move upwardly the knockout pins (26) through the openings (31) (33) and the holes (17), so that the fastened assembly is detached from the receiving means (18).

The successive operations may be conducted by means of an apparatus (45) as shown in FIG. 10. The apparatus (45) is substantially same as the apparatus (35) except the knockout apparatus (27) is replaced with a vertically movable knockout apparatus (46). The knockout apparatus (46) consists of a base (47), knockout pins (26'), and a chuck (48) and is disposed under the bolster (32), the knockout pins (26') and the chuck (48) being attached on the base (47). A slide shaft (49) is attached at one end thereof to the lower surface of the slide (37) and extends downwardly through an aperture (50) piercing the receiving means (18) and the bolster (32). The slide shaft (49) is provided with a nub (51) at the other end thereof, so that the chuck (48) may grasp the nub (51) when the slide (38) has reached to the bottom dead center of the stroke thereof at which the fastening operation is carried out. When the chuck (48) grasps the nub (51), the knockout apparatus (46) is moved upwardly with the upward movement of the slide (37), thus, the knockout pins (26') is moved upwardly through the openings (31) (33) of the bolster (32) and the punch (18), to thereby tap the heads of the screw bodies and push up the fastened assembly. The nub (51) is released from the chuck (48) when the latter strikes against the lower surface of the bolster (32). The base (47) is preferably provided with a cushioning member such as a rubber, a spring or the like at the lower surface thereof to soften the collision of the knockout apparatus (46) against a support member therefor when the chuck (48) has been disengaged from the nub (51).

When the operations are conducted successively as shown in FIGS. 9 and 10, cushioning means such as a spring, foamed urethane or the like is preferably interposed between the receiving means (18) and the metal plate (15) so that striking force is applied uniformly on the stepped necks (14).

It is to be understood that, in the embodiment shown in FIGS. 1 to 3, the fastening and detaching operations may be conducted successively in the same manner as described above.

The angular stepped necks (14") and the angular openings (16') are preferably shaped hexagonally, as shown in FIG. 4, to prevent more sufficiently the screw means (11) and the metal plate (15) from rotating against each other and to fasten more firmly the both. The portions (23) of the receiving means (18) to be pressed against the stepped necks (14), as shown in FIG. 6, are preferably made of hard metal so as to cause the stepped necks (14) and the metal plate (15) to be deformed more fully.

As many apparently widely different embodiments of the present invention may be made without departing from the spirit and the scope thereof, it is to be understood that the invention is not limited to the specific embodiments thereof except as defined in the appended claims.

What is claimed is:

1. A method for fastening a screw having a polygonally shaped stepped neck formed between a shaped screw head having a bearing surface and an elongated screw body to a metal plate having a polygonally shaped opening corresponding to said polygonally shaped stepped neck comprising the steps of
    inserting said stepped neck into said opening so that said bearing surface is disposed in flush contact with said metal plate;
    inserting said elongated screw body in a receiving means having an elongated hole bored therein, said elongated hole having an outer diameter radially dimensioned slightly larger than the outer diameter of said elongated screw body; and
    applying a force to said receiving means to thereby affect an upsetting operation by applying force to said stepped neck to press said stepped neck and said receiving means against each other, so that the outer wall of said stepped neck is radially enlarged to form a radially extending flange and said opening in said metal plate is deformed plastically whereby the outer surface of the flange is substantially flush with the surface of said plate to thereby securely clamp said metal plate between said flanges and said screw head.

2. A method as defined in claim 1 including a step of detaching said fastened assembly from said receiving means by tapping the head of said screw body and pushing up said fastened assembly with a knockout means.

3. A method as defined in claim 2 wherein said knockout means comprises at least one knockout pin for detaching said fastened assembly from said receiving means and means for actuating vertically said knockout pin, said knockout pin being disposed to be in alignment with said hole of said receiving means so that said knockout pin is moved upwardly through said hole to tap said head of said screw body and push up said fastened assembly.

4. A method as defined in claim 1 wherein cushioning means is interposed between said receiving means and said metal plate.

5. A method as defined in claim 1 wherein said screw head of said screw means is a flat fillister head.

6. A method as defined in claim 1 wherein said angular stepped neck is shaped hexagonally and said angular opening of said metal plate is also shaped hexagonally so as to allow said hexagonal stepped neck to be inserted thereinto.

7. A method as defined in claim 1 wherein said screw head of said screw means is sandwiched between said metal plate and a pedestal plate so as to bring said screw head into close contact with said metal plate at the fastening operation.

8. A method as defined in claim 1 wherein the portion of said receiving means to be pressed against said stepped neck is made of hard metal.

9. A method for fastening a screw as claimed in claim 1, including the step of securely fastening a plurality of screws in a plurality of openings formed in said metal plate, each of said openings being disposed in said plate at a predetermined distance with respect to each other, said openings have an axial orientation that is parallel with respect to each other.

10. A metal plate having at least one screw fastened thereto formed by the method as defined in claim 35.

11. A metal plate having at least one screw fastened thereto by the method defined in claim 10 wherein said screw head of said screw is a flat fillister head.

12. A metal plate having at least one screw fastened thereto by the method defined in claim 10 wherein said polygonal stepped neck is shaped hexagonally and said polygonal opening is also shaped hexagonally so as to allow said hexagonal stepped neck to be inserted therein and prevented from rotating.

13. A metal plate having a plurality of screws fastened thereto by the method as defined in claim 9.

14. A metal plate having a plurality of screws fastened thereto by the method defined in claim 9 wherein said screw head of each said screw is a flat fillister head.

15. A metal plate having a plurality of screws fastened thereto by the method defined in claim 9 wherein said polygonal stepped necks are each shaped hexagonally and each said polygonal opening is also shaped hexagonally so as to allow said hexagonal stepped necks to be inserted therein.

* * * * *